Sept. 27, 1966  G. ROLLAT  3,274,891

CLOSED-FRAME MACHINE

Filed June 24, 1965  2 Sheets-Sheet 1

Sept. 27, 1966            G. ROLLAT            3,274,891

CLOSED-FRAME MACHINE

Filed June 24, 1965            2 Sheets-Sheet 2

United States Patent Office

3,274,891
Patented Sept. 27, 1966

3,274,891
CLOSED-FRAME MACHINE
Germain Rollat, Geneva, Switzerland, assignor to Societe Genevoise d'Instruments de Physique, Geneva, Switzerland, a firm of Switzerland
Filed June 24, 1965, Ser. No. 466,748
Claims priority, application Switzerland, July 1, 1964, 8,649/64
4 Claims. (Cl. 90—16)

The present invention relates to tool-machines such as a centre-marking, milling or boring machine, and to measuring machines and, among such machines, it is applicable to those which have a closed frame, that is to say, machines of the type which comprise a movable horizontal crosshead which is parallel to the table of the machine and moves along two vertical columns, being controlled by two vertical screws each located at one end of the crosshead, a headstock-carrying slide which is movable along the said crosshead, and a device for compensating the tilting effect produced on the crosshead by the slide, when the latter is located elsewhere than at the centre of the crosshead.

In such machines which have been constructed hitherto the device for compensating the tilting of the crosshead is complicated and requires the provision of, for example, hydraulic means for relieving the load on the suspension screws of the crosshead, or the compensating device may even be inaccurate because, for example, it comprises a differential mechanism, the sets of gears of which have an unfavourable effect on accuracy.

The machine according to the present invention is characterised by the fact that the said compensating device comprises a fixed cam-member, a first feeler carried by the crosshead and movable along the said cam-member, during vertical movement of the crosshead, a second cam-member carried by the crosshead and movable under the control of the said first feeler and a second feeler carried by the slide and movable along the said second cam-member during movement of the slide, the said second feeler being adapted to actuate a control mechanism, thereby to operate at least one of the said screws so as to cause it to rotate in one direction or the other, according to the position in height of the crosshead and the transverse position of the slide, and thus to maintain the crosshead parallel to the table whatever the position of the crosshead and of the slide.

The invention will now be described more fully with reference to the accompanying drawings which show, by way of example only, one embodiment of the invention as applied to a centre-marking machine. In the drawings.

Figure 2:
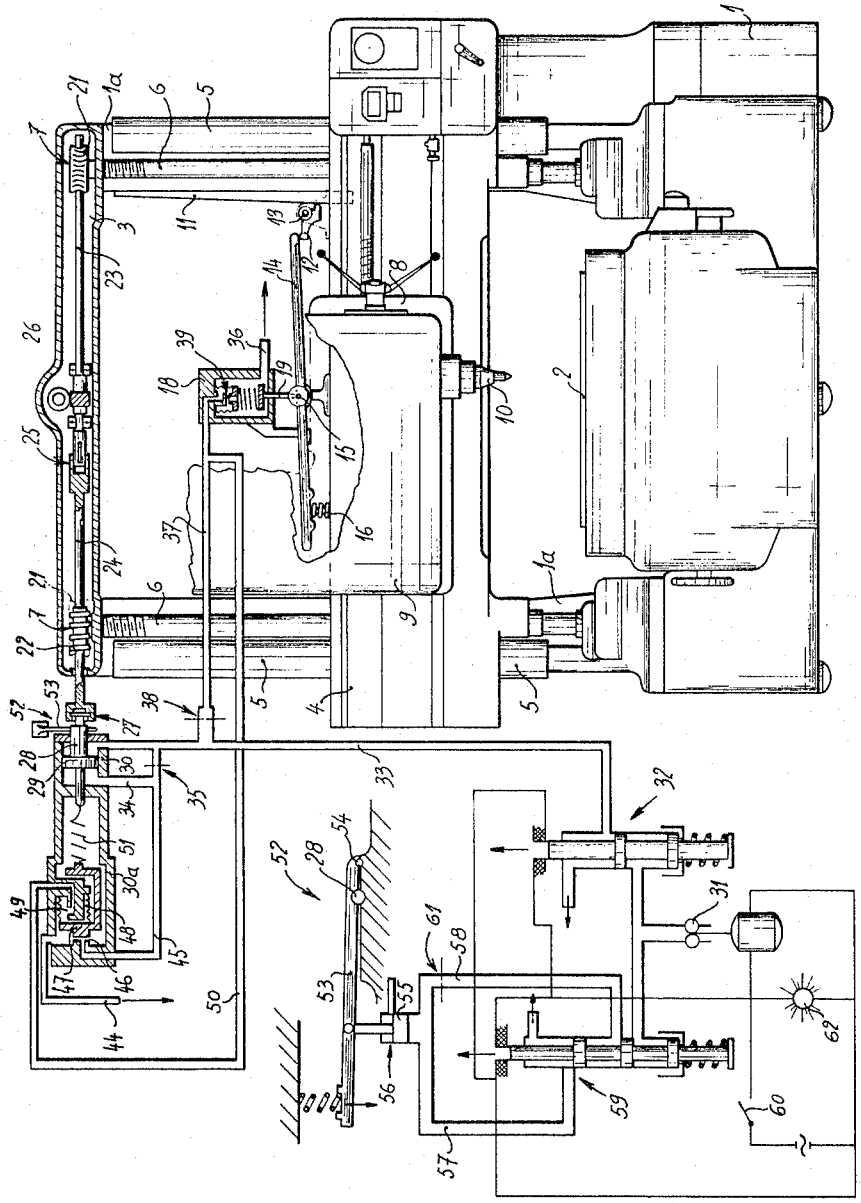
FIGURE 2 is an elevational view, partly in section, of the machine according to FIGURE 1 and showing also, diagrammatically, control mechanism for the compensating device.

Referring to the drawings, the machine shown therein comprises a frame 1 supporting a working table 2 and having two vertical columns 1a connected at their upper ends by a fixed crosshead 3. The machine also comprises a movable crosshead 4 moving along two vertical slide guides 5 each carried by one of the columns 1a. The vertical movements of the movable crosshead 4 are controlled by two screws 6 on which the crosshead 4 is mounted and which are each controlled by a worm mechanism 7 (FIGURE 2).

The movable crosshead 4 carries a slide 8 which is movable along the said crosshead, that is to say, transversely with respect to the vertical median plane of the machine, and on which a headstock 9 is mounted; the spindle of the machine is designated by the reference 10.

When the slide 8 is located in the centre of the crosshead 4, the latter is accurately parallel to the table 2. On the other hand, when the slide is disposed beyond the centre, that one of the screws 6 which is nearer thereto is more heavily loaded and moves away more than the more distant screw. The crosshead 4 therefore slopes, to a very small extent it is true, but to an extent which is by no means negligible in a high-precision machine. It is to be observed that this difference of distance is all the more perceptible the further the slide moves from the centre and the closer the crosshead 4 is to the lower end of the suspension screws, the elongation of the latter, under tension, being proportional to their length.

Since machines of the above-mentioned type are generally equipped with a device for locking the movable crosshead relatively to the vertical slide guides, the operator takes care to shift the crosshead, as far as possible, only when the headstock-carrying slide is located in the middle of the latter so as then to lock the crosshead, so that it remains perfectly parallel to the table. Nevertheless, this is not always possible, the shape of some parts which have to be worked sometimes compelling the operator to de-centre the slide before effecting locking of the crosshead.

For this reason, the machine shown is equipped with a device for compensating the above-mentioned tilting effect. This compensating device comprises a fixed cam 11 constituted by an inclined surface which is mounted along one of the columns 1a of the machine and with which there co-operates a feeler constituted by one arm of a lever 12 which is articulated to the movable crosshead 4 at 13. The compensating device comprises a second cam-member designated by the reference 14, which is pivoted on the crosshead at 15, exactly in the middle of the latter. This cam-member 14, which is of rectilinear form, is subjected to the action of a spring 16 acting in the vicinity of one of its ends and tending to keep the opposite end in contact with the second arm of the lever 12. Thus, the inclination of the cam-member 14 is a function of the height at which the movable crosshead 4 is located.

Figure 3:
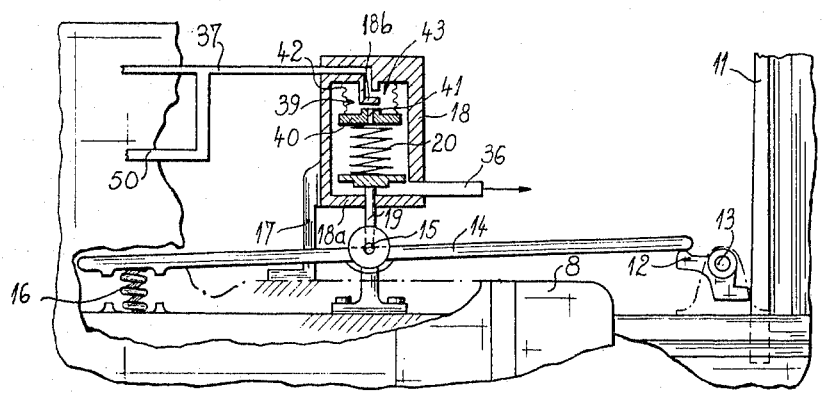
FIGURE 3 is an elevational view, partly in section and on a larger scale, of a detail which is also visible in FIGURE 2.

The slide 8 carries, fixed to it by a bracket 17, a casing 18 (FIGURES 2 and 3), through the bottom 18a of which there extends a sliding rod 19 which constitutes a feeler and is kept in contact with the cam-member 14 by means of a coil spring 20 disposed in the casing 18. Thus, the position of the feeler rod 19, which slides on the inclined cam-member 14 during movement of the slide 8 on the crosshead 4, varies on the one hand according to the position of the slide on the crosshead and on the other hand according to the position of the crosshead relatively to the vertical columns. It is to be observed that the plane surface of the cam-member 14 on which the feeler 19 slides passes through the pivotal axis 15 about which the cam-member is pivotable relatively to the slide, so that the variations in the position of the cam-member as a function of the variations in the height of the crosshead do not affect the position of the feeler when the slide is located in the middle of the crosshead and, on this account, no tilting of the latter occurs.

Figure 1:
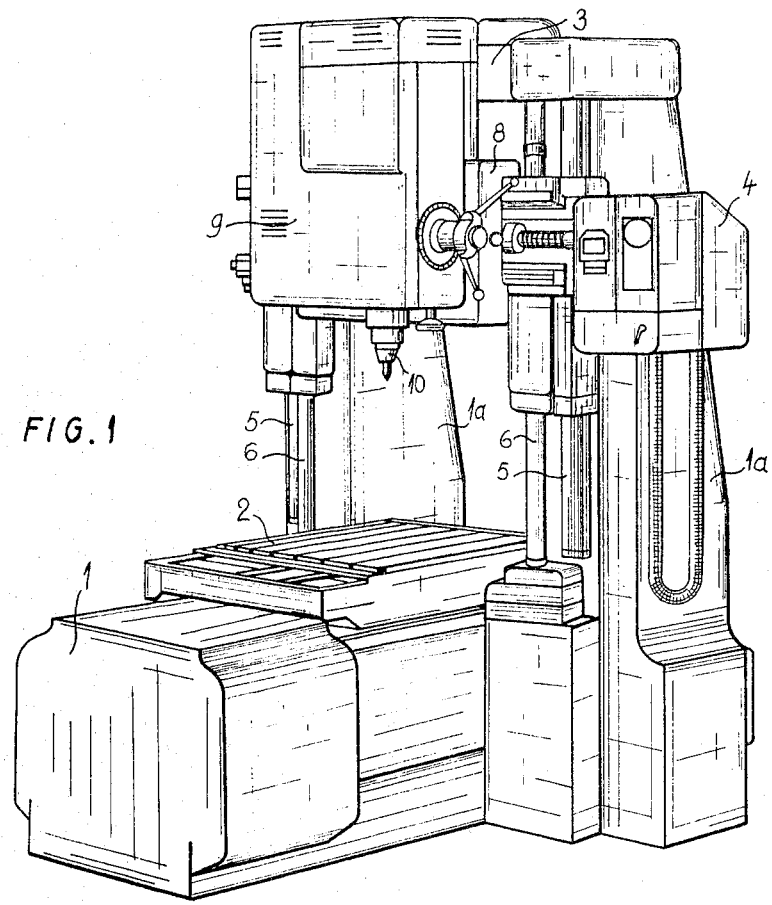
FIGURE 1 is a perspective view of the machine.

The compensating device comprises a control mechanism for one of the screws 6, this mechanism being connected to the feeler by hydraulic apparatus which will be described hereinafter. The said control mechanism acts on the worm mechanism 7 of the screw 6 located at the left in FIGURES 1 and 2.

Each worm mechanism 7 comprises a wheel 21 fixed at the upper end of one of the screws 6 and a worm 22, one of the worms being carried by a shaft 23 and the other by a shaft 24. The two shafts 23 and 24 are arranged as extensions of one another; they are fast with one another against relative rotation but are able to slide one with respect to the other, due to the provision of a splined coupling 25 which connects them. They are driven by a motor (not shown) carried by the fixed upper crosshead 3 and connected to the shaft 23 by a worm mechanism 26. By means of a coupling device 27, the shaft 24 is connected, so as to be fast against relative axial movement but not against relative rotation, to the rod 28 of a piston 29 which is movable in a pilot cylinder 30. Thus, through the medium of the shaft 24 and the worm 22 mounted thereon, the movements of the piston 29 produce slight angular movements of the screw 6 disposed on the left in FIGURE 2. It is these angular movements which compensate the tilting which the crosshead 4 undergoes when the slide 8 is not situated in the centre and re-establish accurate parallelism between the crosshead and the table of the machine. In a practical case where the screw 6 has a pitch of 10 mm., for example, an angular movement of $2/1000$ of a revolution of the screw, caused by a longitudinal movement of the piston 29 of 1.3 mm., produces a vertical displacement of the crosshead of 0.02 mm., which corresponds to the maximum elongation which the screw 6 can undergo in a practical case.

So as to ensure compensation, the movements of the piston 29 of the pilot cylinder 30 are controlled by the feeler 19 through the medium of the hydraulic apparatus shown in FIGURE 2. This hydraulic apparatus comprises a pump 31 connected by an electrically controlled valve 32 and by a pipe 33 to the front chamber of the pilot cylinder 30. The rear chamber of the cylinder 30 is also connected to the pipe 33 by a pipe 34 having a constriction at 35.

The pipe 33 is connected to an outlet, at 36, by a pipe 37, by way of a constant constriction 38 and a variable constriction 39. This variable constriction 39 is constituted by a disc 40 which has a central hole 41 and is fixed to the spring 20 of the feeler 19. The disc 40 is connected to the casing 18 by a bellows diaphragm 42 defining a chamber 43 into which the pipe 37 opens. As the disc 40 moves nearer to or further away from a central projection 18b on the casing 18, under the control of the feeler 19, it alters the cross-section of the passage connecting the pipe 37 to the outlet 36.

The pipe 34 is also connected to an outlet, at 44, by a pipe 45 and a variable constriction 46. This variable constriction is constituted by a movable member 47 moving inside a cylindrical body 30a forming an extension of the pilot cylinder 30; the said member 47 is connected to the body 30a by a bellows diaphragm 48. This bellows diaphragm defines a chamber 49 in which there terminates a pipe 50 which is connected at its other end to the pipe 37, between the constrictions 38 and 39 of the latter; a coil spring 51 connects the piston 29 to the member 47. The position of the member 47 and, consequently, the cross-section of the constriction 46 are thus a function of, on the one hand, the position of the piston 29 and, on the other hand, the pressure prevailing in the pipe 50. Thus the pressure prevailing in the pipe 45, which determines the position of the piston 29, is a function of the cross-section of the constriction 39 and, consequently, of the position of the feeler 19; the position of the piston 29 is also determined by the servo-control constituted by the connection provided between the said piston 29 and the member 47, which connection ensures that the piston 29 remains stable once it has found its position of equilibrium.

The machine also includes a brake 52, an enlarged diagrammatic view of which is included in FIGURE 2, showing the arrangement thereof partly in elevation and partly in section; the brake 52 is adapted to lock the rod 28 of the piston 29 when the compensating device is not in operation. The brake 52 comprises a lever 53 which is pivotally mounted at 54 and is controlled by a piston 55 moving in a cylinder 56, the rear chamber of which cylinder is connected by means of two pipes 57 and 58 to an electrically controlled valve 59 which is itself connected to a pump 31.

When the balancing device is put into operation, by manual closure of a switch 60, the pipes 33 and 58 are put under pressure by the pump 31. However, the pipe 58 has a constriction at 61, so that pressure is established in the pilot cylinder 30 before being established in the cylinder 56; thus the rod 28 of the piston 29 is released only after the compensating device has been placed under pressure. At the same time a pilot lamp, designated by the reference 62, lights up so as to warn the operator that the compensating device is in operation. Once the desired position has been reached and the crosshead has been locked, the operator opens the switch 60 so as to put the compensating device out of action before commencing machining.

It is to be observed that, when the machine comprises a locking device for clamping the horizontal cross-beam on its slide guides when the machine is working, control of the compensating device and of the locking device will be synchronised in such manner that the unlocking of the crosshead occurs only after the compensating device has been placed under pressure, while when the latter has been put out of operation, the crosshead is locked.

What I claim is:

1. In a tool-machine, such as a centre-marking, milling or boring machine, or a measuring machine having a closed frame, that is to say, a machine of the type which comprises a movable horizontal crosshead which is parallel to the table of the machine and moves along two vertical columns, being controlled by two vertical screws each located at one end of the crosshead, and a headstock-carrying slide which is movable along the said crosshead, in such a machine, a fixed cam-member, a first feeler carried by the crosshead and movable along the said cam-member during vertical movement of the crosshead, a second cam-member carried by the crosshead and movable under the control of the said first feeler and a second feeler carried by the slide and movable along the said second cam-member during movement of the slide, the said second feeler being adapted to actuate a control mechanism, thereby to operate at least one of the said screws so as to cause it to rotate in one direction or the other, according to the position in height of the crosshead and the transverse position of the slide, and thus to maintain the crosshead parallel to the table whatever the position of the crosshead and of the slide.

2. In a machine as claimed in claim 1, the fact that the said control mechanism includes a servo-mechanism to determine the position of the said one screw which is operated by the compensating device.

3. In a machine as claimed in claim 1, wherein the two suspension screws of the crosshead are controlled by worms carried by shafts, the fact that the shaft carrying the worm which controls at least one of the suspension screws is movable axially and is operatively connected to the said control mechanism in such manner that axial movements of the shaft are added to rotational movements of the worm, thereby to cause the said suspension screw to turn.

4. In a machine as claimed in claim 1, hydraulic control means through the intermediary of which the compensating device acts on the control mechanism, the hydraulic pressure in the hydraulic control means being controlled by the position of the said second feeler.

No references cited.

WILLIAM W. DYER, JR., *Primary Examiner.*

G. A. DOST, *Assistant Examiner.*